United States Patent [19]

Morisawa et al.

[11] Patent Number: 5,045,892
[45] Date of Patent: Sep. 3, 1991

[54] RECORDING PAPER TRANSPORT MECHANISM

[75] Inventors: Satoru Morisawa; Masato Matsubara, both of Tokyo, Japan

[73] Assignee: Asahi Kogaku Kogyo Kabushiki Kaisha, Tokyo, Japan

[21] Appl. No.: 251,180

[22] Filed: Sep. 30, 1988

[30] Foreign Application Priority Data

| Sep. 30, 1987 | [JP] | Japan | 62-149546[U] |
| Feb. 24, 1988 | [JP] | Japan | 63-23586[U] |
| Mar. 22, 1988 | [JP] | Japan | 63-37295[U] |
| Mar. 22, 1988 | [JP] | Japan | 63-37296[U] |
| Mar. 22, 1988 | [JP] | Japan | 63-37297[U] |
| Mar. 22, 1988 | [JP] | Japan | 63-37298[U] |

[51] Int. Cl.$^5$ .............................. G03G 15/00
[52] U.S. Cl. .................... 355/309; 271/248
[58] Field of Search ............... 355/309, 308, 312, 271, 355/274; 271/3.1, 193, 248

[56] References Cited

U.S. PATENT DOCUMENTS

| 2,729,136 | 1/1956 | Feick et al. ............... 271/248 X |
| 3,415,509 | 12/1968 | Tyburski et al. ............ 271/248 |
| 3,647,292 | 3/1972 | Weikel, Jr. . |
| 3,697,170 | 10/1972 | Bhagat et al. . |
| 3,711,196 | 1/1973 | Carreira et al. . |
| 3,830,589 | 8/1974 | Allen . |
| 3,976,370 | 8/1976 | Goel et al. . |
| 4,162,843 | 7/1979 | Inoue et al. ............... 355/274 X |
| 4,204,731 | 5/1980 | Kohler et al. . |
| 4,389,112 | 6/1983 | Ogata et al. . |
| 4,443,095 | 4/1984 | Tsushima et al. . |
| 4,737,816 | 4/1988 | Inoue et al. . |

FOREIGN PATENT DOCUMENTS 63-097975  4/1988  Japan .

Primary Examiner—R. L. Moses
Attorney, Agent, or Firm—Sandler, Greenblum & Bernstein

[57] ABSTRACT

In an imaging device employing an electrophotographic process, the arrangement having a guide member located in a recording paper feed path extending from a transfer unit to a fixing unit to cause the recording paper to be conveyed along the guide member in a predetermined direction under the control of an electrostatic power. Alternately, the imaging device has guide members for restricting the up and down displacement of the side edge of one lateral side of a recording paper feed path extending from the transfer unit to the fixing unit. The guide members are spaced from each other to allow the recording paper to pass through the space to restrict the up and down displacement of the lateral edge of the recording paper. Thus, the recording paper is held and guided in its feed direction to be brought into the fixing unit.

6 Claims, 21 Drawing Sheets

RECORDING PAPER TRANSPORT MECHANISM

BACKGROUND OF THE INVENTION

This invention relates to a transport mechanism to carrying a sheet of recording paper to a desired position in an imaging device, employing a so-called electrophotographic imaging process, and more particularly to a transport mechanism to transport a sheet of recording paper to which a toner image has been transferred but has not yet been fixed from a transfer unit to a fixing unit.

Imaging devices employing the electrophotographic imaging process are known in the art, such as electronic copying machines and laser printers, in which a uniformly charged surface of a photoconductive drum undergoes exposure to build a certain latent image. This latent image is then powdered with toner for development of a toner image, which is transferred onto a sheet of recording paper and permanently fixed to it by means of a fixing unit. The sheet of recording paper is then discharged out of the imaging device.

Referring to an example of a laser printer illustrated in FIG. 25, the imaging device employing the electrophotographic process comprises a drum 1 that is coated on its surface with a photoconductive material and a charger unit A, a exposing unit B, developing unit C, transfer unit D, cleaning unit E and decharger unit F, all mounted around the drum 1 in the order illustrated order in the rotational direction of the drum 1. The photoconductive material coated on the drum 1, which is uniformly charged by the charger unit A, is exposed to laser beams carrying image information by means of the exposure unit B, forming a latent image thereon. The toner is then adhered to the latent image by the developing unit C. The transfer unit D then transfers the resultant toner image formed on the drum 1 to a sheet of recording paper P, which is transported in synchronism with the rotation of the drum 1. The toner image is fused onto the paper P by means of the fixing unit G, the paper then being allowed to leave the imaging device.

The sheet of recording paper P to which the toner image has been transferred by the transfer unit D is led to the fixing unit G by means of a guide member or transport mechanism, not shown. Since the paper being conveyed from the transfer unit D to the fixing unit G carries the transferred toner image that remains unfixed, the guide member or transport mechanism is configured to guide or hold the back (the side wherein no toner image is deposited) of the recording paper P.

In case that the toner image is transferred to the up side of the recording paper P and the paper P is discharged with the same side up (called a face-up discharge system), it is easy to guide the paper P along the paper feed path by holding the back (down) side of the paper P, on which no toner image is deposited.

In order to develop a color image employing a similar electrophotographic process, there are so-called color copiers or similarly configured printers available. In such an imaging device, an original image is separated into three primary color images by means of red, green and blue filters. The separated color images are developed by colored cyan, magenta and yellow toners and are transferred to the recording paper so that they are laid down one upon another, thus providing a duplicate of the same colors as the original image. In such color imaging devices, the transfer process must be repeated several times on the same area of the same recording paper (as many times as there are toner colors). To simplify this process, a transfer drum is provided adjacent to the photoconductive drum for a synchronized rotation with the latter, so that the toner image on the photoconductive drum is transferred to the surface of the paper wrapped around the circumferenctial surface of the transfer drum.

However, especially for continuously feeding multiple sheets of paper, as in printers, a so-called face-down discharge system, with which paper sheets are discharged with their image-deposited sides down, is desired to enable the discharged sheets of paper to be stacked in the original page number order (The sheets of paper are stacked in the reversed order of page number in the face-up discharge system).

Such a face-down discharge process is made possible by an arrangement of the operating parts (charger, exposure, development, transfer, cleaning and decharger units) such that the image is transferred to the down side of the paper at the upper area of the drum surface, and the paper with the image deposited on the down side is discharged out of the device as it is. In such an arrangement, however, the toner image deposited on the down side of the paper prohibits the transport system from holding the down side of the paper in the paper feed path from the transfer unit to the fixing unit. As a result, it is hard to appropriately guide the paper in the correct transport direction, making it difficult to bring the paper into a correct position at the fixing unit.

One solution to this problem is to use the same arrangement of the drum and the parts around the drum as for the face-up discharge system, while turning the recording paper up side down in the paper feed path from the fixing unit to the discharge unit to allow the paper to be discharged with its face down. Such an arrangement, however, has a problem in that the paper feed path must be longer and more complicated, resulting in more frequent paper clogging in this path and an increased size of the device.

In the case of the color imaging device, in which several transfer processes take place on the recording paper wrapped around the transfer drum, there has been a problem in that the paper wrapped around the drum remains curled after separating from the drum, making a proper guiding control of the paper in a predetermined direction difficult. There are some devices in which a metal guide plate provided with a number of perforations are placed along the paper feed path so that suction air sent from a blower behind the guide plate applies a drawing force to the recording paper. With this structure, the recording paper is drawn to the guide plate to straighten out the curl, allowing the paper to travel straight along the guide plate. The guiding direction of the paper can be adjusted to a certain extent by changing the setting of the guide plate, ensuring a greater freedom in design choice. However, this structure (using the blower for the paper feed) requires extra mechanical parts, including the blower and its piping and is associated with other problems, such as interference with the parts of the fixing unit and so on, heat generated from the blower and power supply capacity. Providing solutions to the aforementioned problems again leads to a larger size and greater complications of an overall device and therefore an increased cost.

SUMMARY OF THE INVENTION

It is therefore an object of the invention to provide a recording paper transport mechanism that is capable of stably carrying sheets of recording paper with the toner image deposited on their up sides or those with curls due to wrapping around the transfer drum.

Another object of the invention is to enable the paper feed path the transfer unit to the fixing unit to have the shortest possible length in an imaging device with a face-down paper discharge system, thereby providing a paper transport mechanism which implements a more compact size of such an imaging device.

In one of aspect of the invention, there is provided a recording paper transport mechanism comprising a guide member made of dielectric material located in a predetermined position to cause the recording paper to be conveyed along the guide member in a predetermined direction under the control of an electrostatic power.

Another arrangement of the invention comprises an endless made of a dielectric material which is located above a recording paper feed path extending from a transfer unit to a fixing unit, the endless belt being adapted to be circulated in the direction the recording paper feed path, and means for charging the endless belt. This arrangement enables the recording paper to be positioned in a face-down state to be electrostatically attracted to the endless belt and be accurately conveyed in a predetermined direction.

The same effect can be provided by an alternative to the endless belt by a guide plate made of a conductive material that is located above a recording paper feed path extending from a transfer unit to a fixing unit, the guide plate being connected with a voltage applying means.

The arrangement may also comprise guide elements placed along at least one side of the recording paper feed path from transfer unit to fixing unit to restrict up and down movement of the recording paper, the elements being spaced from each other to allow the recording paper to pass through the space, whereby the recording paper is brough into the fixing unit in the predetermined direction with its one side restrained from up and down displacement out of proper position. The arrangement thus enables the recording paper to be guided in the feeding direction while holding the marginal area of the paper which is not used for transfer of the image, so that the recording paper with an unfixed toner image deposited on its down side can be properly held and guided into the fixing unit. This makes it possible to provide a compact imaging device with a face-down discharge system having the shortest possible length of recording paper feed path.

DESCRIPTION OF THE ACCOMPANYING DRAWINGS

Figure 20B:
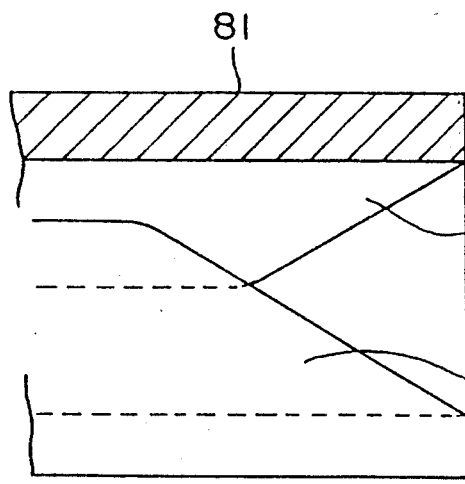
Figure 21:
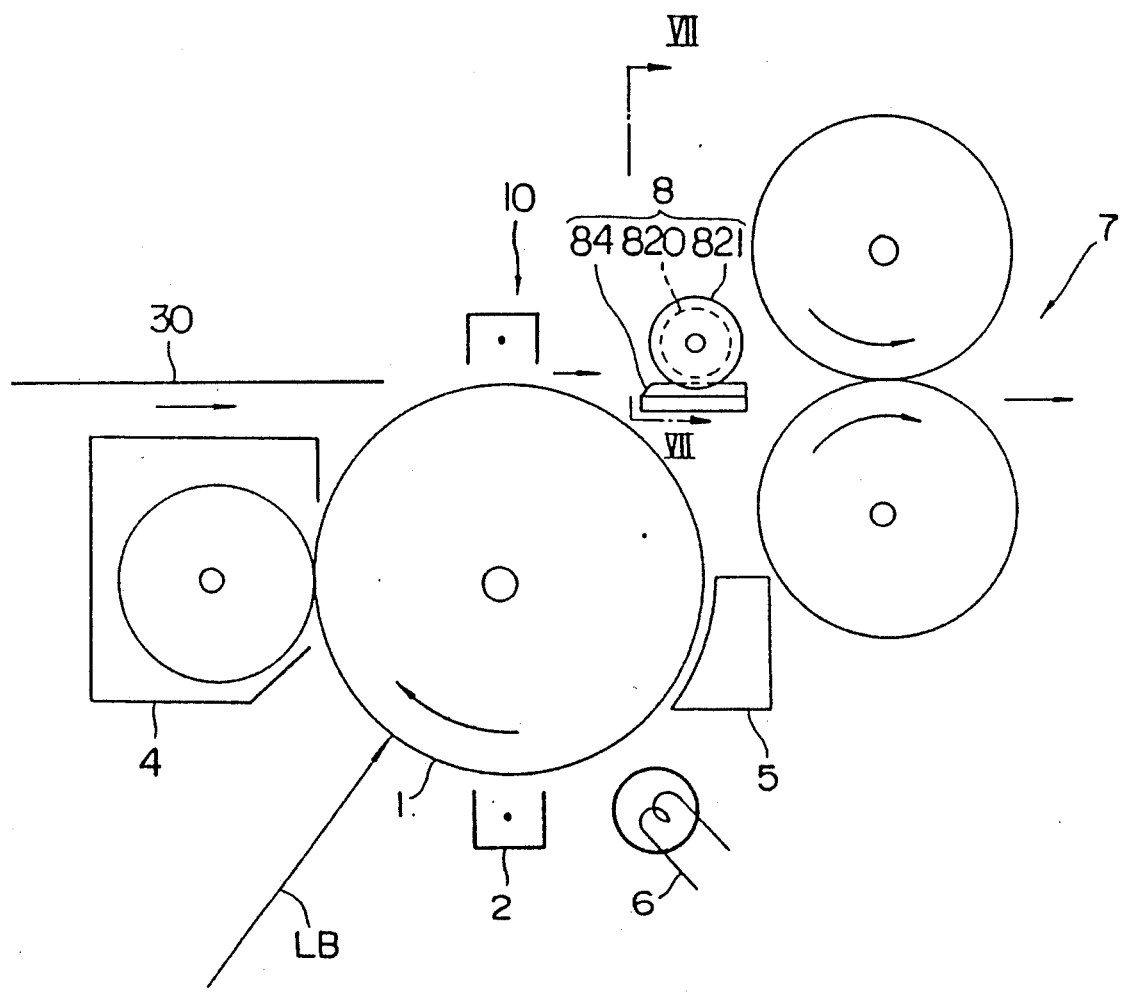
Figure 22:
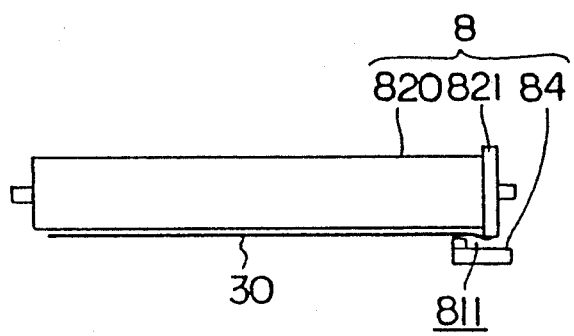
Figure 24:
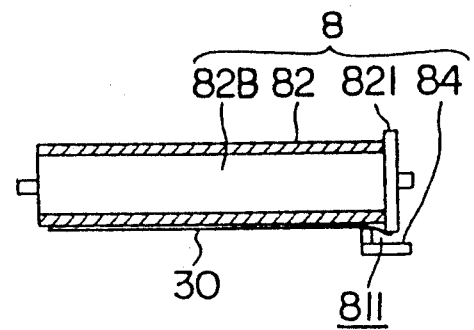
Figure 23:
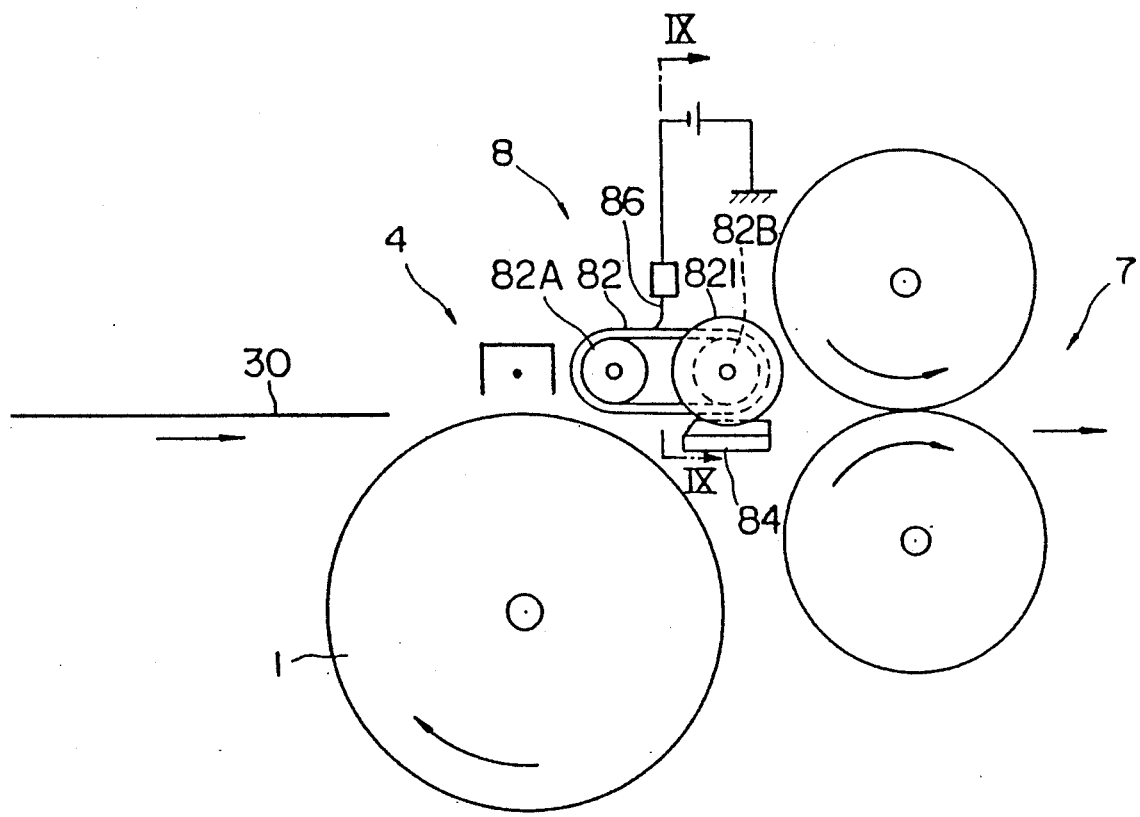

FIGS. 20 (A) and 20 (B) are enlarged views of bent guide portions thereof;

FIG. 21 is a side elevation showing a general arrangement of still another laser printer device incorporating a ninth embodiment of a recording paper transport mechanism;

FIG. 22 is a view taken in the direction of arrow XII;

FIG. 23 is a side elevation showing a general arrangement of still another laser printer device incorporating a tenth embodiment of a recording paper transport mechanism;

FIG. 24 is a section taken along the line IX—IX thereof; and

Figure 25:
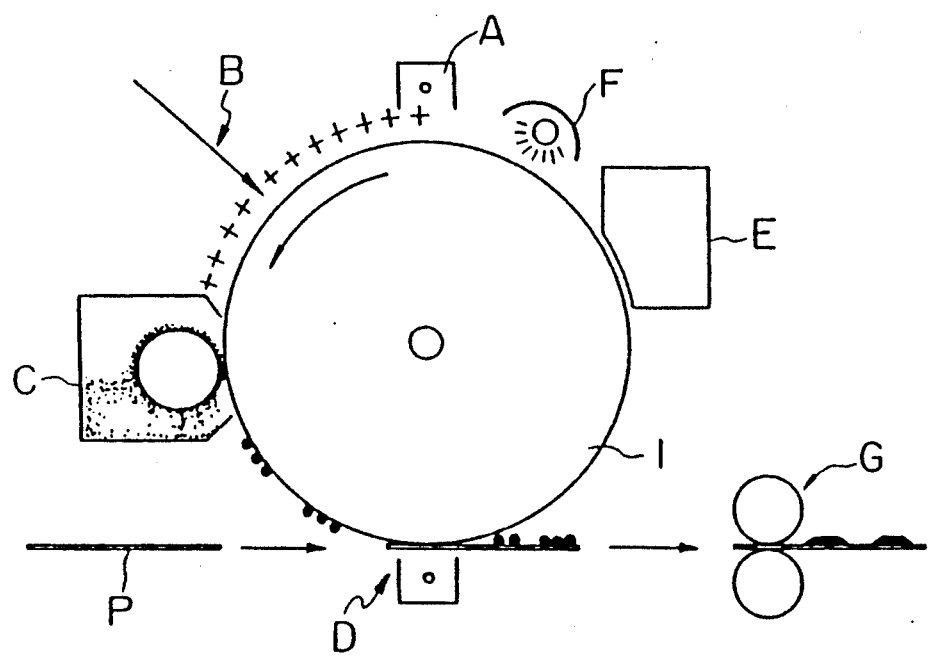

FIG. 25 is a side elevation showing a general arrangement of major parts of a laser beam printer device according to a prior art.

DESCRIPTION OF THE EMBODIMENTS

Figure 1:
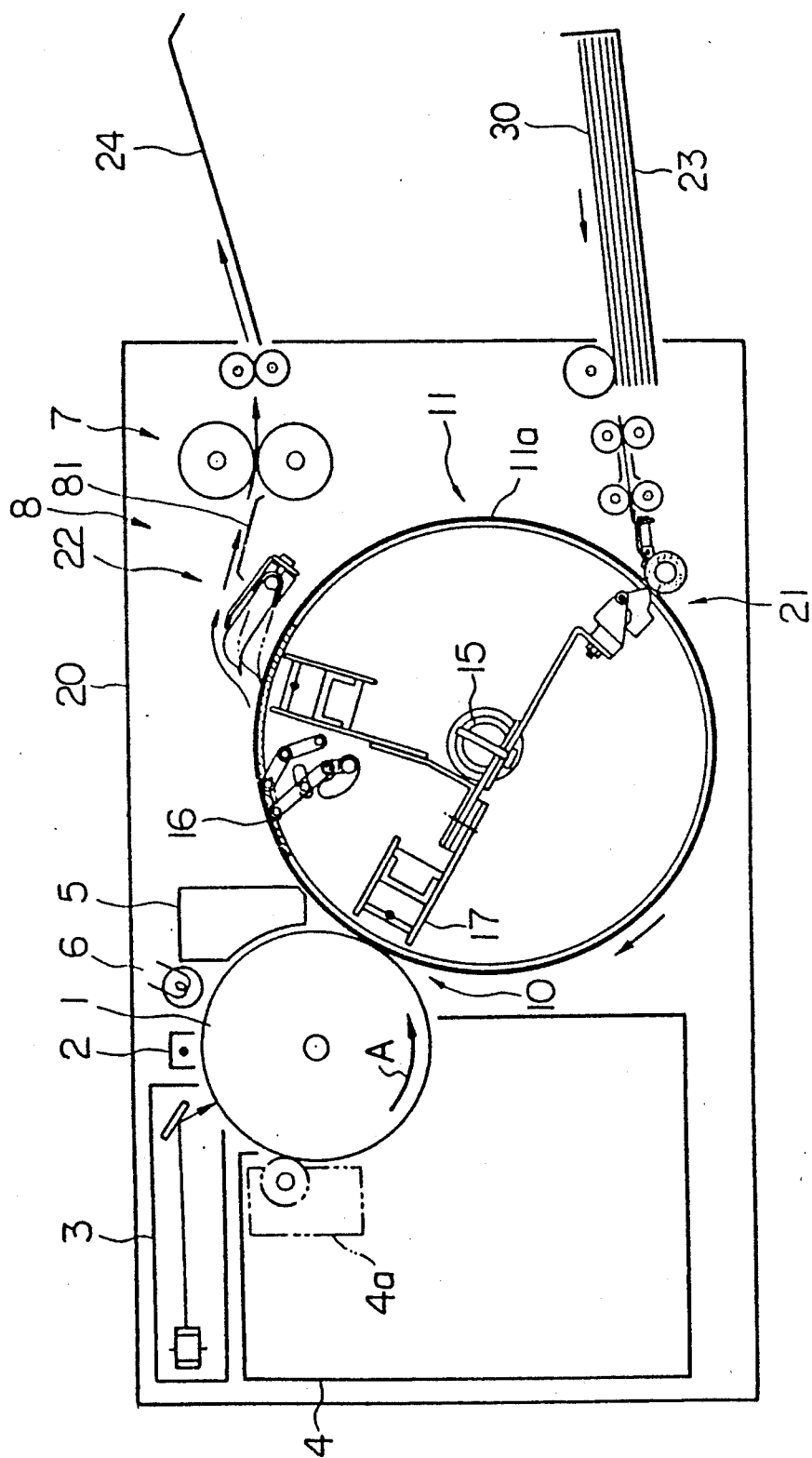
FIG. 1 is a side elevation showing a general arrangement of a color laser printer incorporating a recording paper transport mechanism embodying the invention.

FIG. 1 illustrates a general arrangement of a color laser printer incorporating a recording paper transport mechanism embodying the invention, which has mounted around a drum 1, a charger unit 2 for uniformly charging a photo conductive material coated on the surface of the drum 1, an optical scanning system 3 for scanning the surface of the drum 1 with a laser beam that is turned on and off in accordance with image information, a developing unit 4, with which a latent image is formed by removing the charge from the corresponding charged area through the impingement of the laser beam that is deposited with a toner to develop a toner image, a transfer unit 10 having a transfer drum 11 around which the recording paper 30 is fitted and which is rotatable with the drum 1 to cause the toner image to be transferred onto the recording paper 30, a cleaning unit 5 for mechanically removing toner residual from the drum 1, and a decharger 6 to remove the charge remaining by uniformly shining the surface of the drum 1, all the units being arranged in the order described above in the rotational direction of the drum 1, as indicated by the arrow A in FIG. 1.

The developing unit 4 is provided with multiple developers 4a to enable the development with multiple toners (cyan, magenta, yellow and black) which are required for development of a color image (only the developer 4a is shown by the phantom line with other developers being omitted in FIG. 1). These developers 4a are selectively embodied in accordance with a signal from a control unit, not shown, to develop with a toner of desired color.

Figure 2:
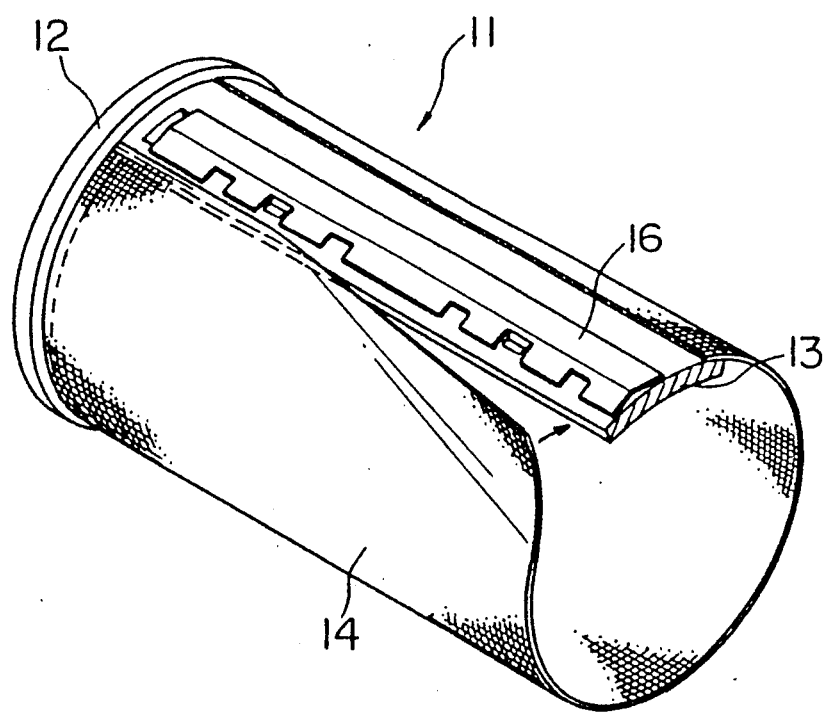
FIG. 2 is a perspective view of a drum thereof.

The transfer drum 11, as shown in FIG. 2, has circular end plates 12 (only one of them is illustrated in FIG. 2, which is a perspective view partly in section) which are at their certain circumferential section interconnected by a circumferential side panel 13 of a predetermined width that is provided to mount thereon a toothed clamp plate 16. A recording paper holder sheet 14, made of a dielectric material, is rolled into a partly broken cylinder with its axial end surfaces and both sides bonded to the circumference of the end plates 12 and to the front and rear sides of the circumferential panel 13, respectively, forming a complete cylinder together with the circumferential panel 13. The toothed clamp 16 mentioned above is mounted on top of the circumferential panel 13 to extend along the rotary axis of the transfer drum 11, in parallel to a shaft 15, to be described later, to clamp the leading end of the recording paper 30.

The transfer drum 11 is mounted on frame 20 by means of shaft 15, which is slidably and rotatably passed through the center of the end plates 12 as indicated in FIG. 1, so that it takes a predetermined position relative to the drum 1 to bring the recording paper 30, fitted on its circumference formed by the recording paper holder sheet 14, into contact with the drum 1. A gearing, not shown, provided on the circumference of one end plate 12 is in mesh with a drive unit, not shown, which thereby drives the transfer drum 11 for rotation with the drum 1. However, the shaft 15 is fixed to the frame 20, causing the rotation of the transfer drum 11 alone.

The transfer drum 11 incorporates therein a transfer charger 17 secured to the shaft 15 in a location opposite to the drum 1. The transfer charger 17 charges the recording paper holder sheet 14 to statically attract the recording paper 30 onto the sheet 14, to thereby hold the recording paper 30 onto the transfer drum 11, while at the same time, also charging the recording paper 30 to capture the toner image transferred from the drum 1.

The arrangement of the individual units mentioned above is such that, in operation, the recording paper 30 is conveyed from the recording paper holder 23 to a discharge tray 24 in the following route. The recording paper 30 is first carried from the recording paper holder 23 along the feed path indicated by the arrow in FIG. 1.

At a pinch unit 21, the paper 30 is at its leading end clamped by a chuck head 16 of the transfer drum 11 and is fitted around the circumferential surface 11a of the transfer drum 11. As the transfer drum 11 rotates as many times as required, the toner image on the drum 1 is repeatedly transferred onto the recording paper 30 on the transfer drum surface 11a. After this multiple transfer processes, the recording paper 30 is separated from the transfer drum 11 by means of a separator unit 22 and is brought to the recording paper guide plate 81 of a transport guide mechanism 8. The paper 30 is then guided by the recording paper guide plate 81 to the space between a pair of fixing rollers in the fixing unit 7. With the multi-color toner image fixed by the heat roll process, the recording paper 30 is sent to the discharge tray 24.

Figure 3:
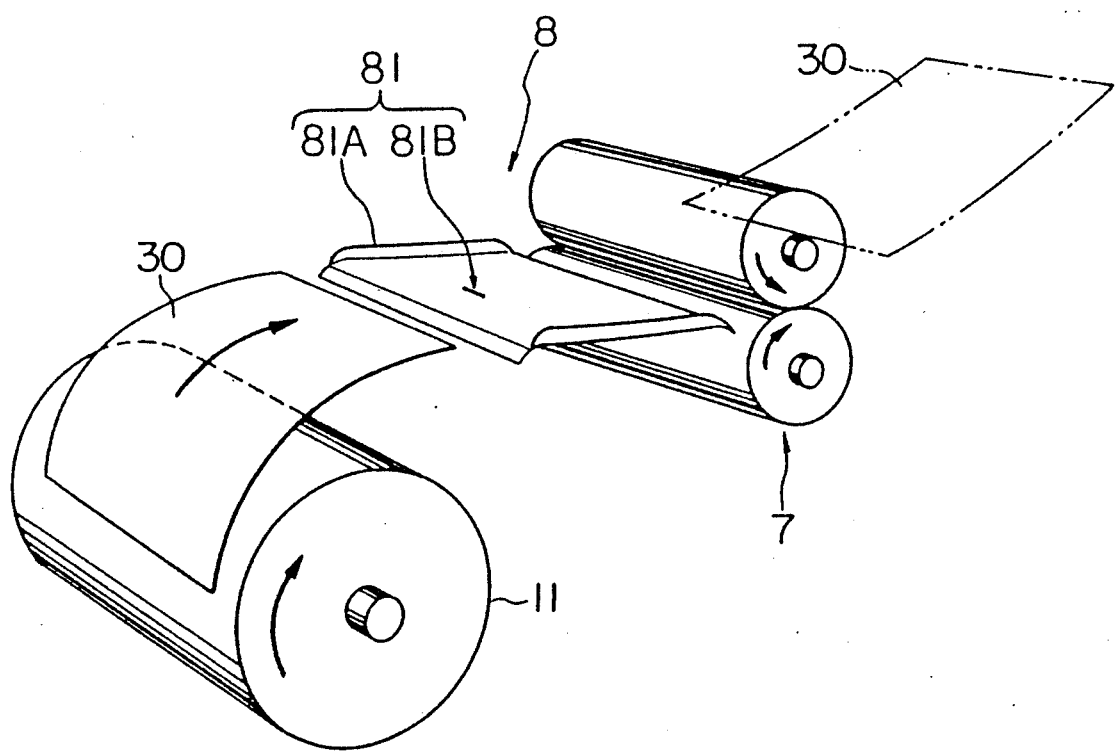
FIG. 3 is a perspective view showing a general arrangement of a recording paper guide tray and associated parts.

FIG. 3 is a perspective view showing a general arrangement of a recording paper guide plate 81 and associated parts.

The recording paper guide plate 81 has a sheet 81B of a dielectric resin, such as a fluorocarbon resin or polyacetal resin, which is bonded to the surface of the metal plate 81A. The guide plate 81 is located between the separator unit 22, not shown, in FIG. 3, adjacent the transfer drum 11 and the fixing unit 7.

The metal plate 81 is of a rectangular shape, whose ends crossing the moving direction of the recording paper 30 are gently bent down, while both side edges parallel to the running direction of the paper 30 are bent upward at a right angle. This shape allows the recording paper 30 to be smoothly guided onto the dielectric sheet 81B with no skew or displacement in the sense crossing the running direction. The metal plate 81A is grounded by way of the frame 20, not shown, in FIG. 3.

Since the recording paper 30 is generally insulated with about $10^{12}\Omega$, the sheet of recording paper remains charged immediately after being separated from the transfer drum 11 after the transfer process is completed. As separation goes on, the leading end of the paper 30 that is separated approaches to the surface of the dielectric sheet 81B on the guide plate 81 and the dielectric sheet is charged to cause the paper 30 to be attracted to it from its leading end.

Such an arrangement allows the recording paper 30 to be guided exactly along the surface of the dielectric sheet 81B due to the electrostatic power, ensuring an accurately controlled conveyance of the paper 30 to the fixing unit 7. This eliminates or minimizes paper clogging or other feeding troubles around the fixing unit 7 due to any defect in the paper guide operation, as well as fixing troubles such as wrinkle lines on the fixed image.

Such an arrangement of the transport mechanism also allows the guiding direction for the recording paper 30 to be changed as desired. Specifically, when the fixing unit 7 is vertically inverted, all to do for the recording paper guide plate 81 is to change the shape of its end slopes to match the orientation of the fixing unit 7, whereby the recording paper 30 is similarly captured by the dielectric sheet 81B to be reliably guided to the fixing unit 7.

Because this transport mechanism is made available simply by bonding a dielectric resin sheet on a metal plate surface, it requires only a small installation space within the laser printer shown in FIG. 1.

This means that such an arrangement of the transport mechanism allows an optimum choice of location of the fixing unit 7 and associated parts, resulting in a lighter, more compact design of the imaging device incorporating this mechanism.

While in this embodiment, the recording paper transport mechanism is shown to be applied to a color laser printer, it is obviously applicable to other types of imaging devices with a recording paper transport mechanism, such as for instance, a monochrome imaging device.

Figure 4:
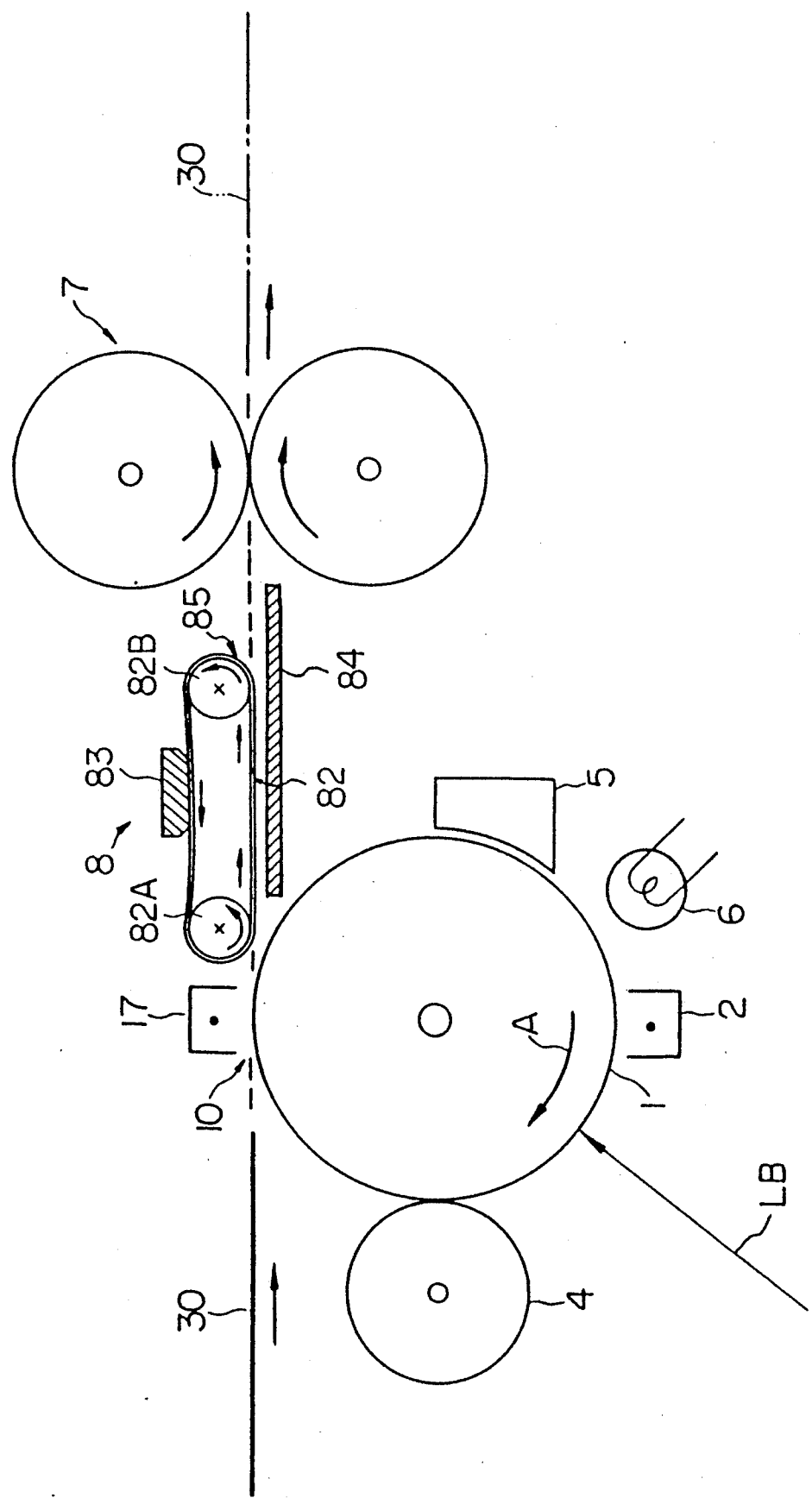
FIG. 4 is a side elevation showing a general arrangement of a monochrome laser printer incorporating another recording paper transport mechanism embodying the invention.

FIG. 4 is a side elevation showing a general arrangement of major parts of a monochrome laser printer incorporating another embodiment of the recording paper transport mechanism. Like numerals and symbols indicate the parts with the same functions as those in FIG. 1.

The present laser printer has, as for the color laser printer shown in FIG. 1, mounted around the charged drum 1 a charger unit 2 for uniformly charging the photoconductive material on the surface of the drum 1, a developing unit 4 with which a latent image is formed by removing the charge from the corresponding charged area through the impingement of a laser beam LB in accordance with image information, which is deposited with a toner to develop a toner image, a transfer unit 10 having a transfer charger 17 to charge the recording paper 30 to cause the toner image to be transferred onto the paper 30, a cleaning unit 5 for mechanically removing toner residual on the drum 1, and a decharger unit 6 to remove the remaining charge by uniformly shining the drum surface, all the units being arranged in order described above in the the rotational direction of the sensitized drum 1, as indicated by the arrow A in FIG. 4.

Transfer of the toner image to the recording paper 30 takes place by bringing the paper 30 to the transfer unit 10 located between the drum 1 and the transfer charger 17. In this case, it is noted that the toner image is transferred to the down face of the recording paper 30. This is because the transfer unit 10 is located above the drum 1, as shown in FIG. 4. The recording paper 30, after the face-down transfer process, has its toner image fixed by means of heat rollers and is discharged out of the laser printer.

Between the fixing unit 7 and the transfer unit 10 is a transport guide mechanism 8 incorporating the second embodiment of the recording paper transport mechanism, with which the recording paper 30 is carried from the transfer unit 10 to the fixing rollers in the fixing unit 7.

The transport guide mechanism 8 comprises a pair of rollers 82A and 82B which are appropriately spaced from each other and located between the transfer unit 10 and the fixing unit 7, an endless belt 82 formed by a film of dielectric organic material extending between the rollers 82A and 82B, a friction charger 83 located above the rollers 82A and 82B approximately intermediate between them so as to bring the friction charger 83 into frictional contact with the surface of the endless belt 82, thereby frictionally charging the belt 82, and edge guides 84 extending from the transfer unit 10 to the fixing unit 7 to guide the right and left edges of the recording paper 30.

The frictional charger 83 is made of natural fiber, synthetic fiber or glass fiber. At least one of the rollers 82A or 82B is rotatably driven by a drive unit, not shown, in the arrow-indicated direction in FIG. 4. Consequently, the endless belt 82 is brought into circular movement with the rotation of the roller 82A or 82B to be charged by the frictional charger 83.

The edge guides 84 guide the down face of the recording paper 30 having the toner image transferred thereto. The distance between them is therefore set to cause no disturbing influence on the toner image formed on the recording paper 30. More specifically, the space is so determined that the guides 84 are in contact with only marginal areas of the recording paper 30 outside the toner image.

The direction of circulation of the endless belt 82 is determined by roller 82A or 82B, as indicated by the arrow in FIG. 4. In particular, roller 82A or 82B is so rotated that, viewing the direction of circulation of the endless belt 82 from its side without the frictional charger 83, i.e. the side with the edge guides 84, the surface spots of the endless belt 82 are circularly moved from the transfer unit 10 to the fixing unit 7.

A separator lug 85 of insulated material is provided with its tapered end abutting against the surface of the endless belt 82 wound around the roller 82B near the fixing unit 7.

With this arrangement, the recording paper 30 that has undergone the face-down transfer process has its up face opposite to the surface with the transferred toner image statically attracted to the under surface of the circulating path of endless belt 81 of the transport guide mechanism 8, whereby it is conveyed toward the fixing unit 7 by the circulation of the endless belt 82. As soon as the recording paper 30 stuck to the endless belt 82 reaches the section wound around the roller 82B, the leading end of the recording paper 30 is separated from the endless belt 82 by means of the separator lug 85 and is brought into the space between the fixing rollers of the fixing unit 7. Despite the difficulty in holding the recording paper 30 after the face-down transfer that would be conventionally encountered because the toner image is carried by the down face of the recording paper, the endless belt 82 is able to firmly hold the recording paper by virtue of an electrostatic attraction to reliably guide it to the fixing unit 7. Face-down discharge is thus accomplished with no need of changing the orientation.

Although it depends on the electrostatic attraction of the recording paper 30 to the endless belt 82, if the radius of the belt section wound around the roller 82B can be limited to a certain smaller value, the arrangement is possible that the recording paper 30 is automatically separated from the endless belt with no need for a separator lug to be brought into the fixing unit 7.

A third embodiment of the recording paper transport mechanism is now described with reference to FIGS. 5 and 6.

Figure 5:
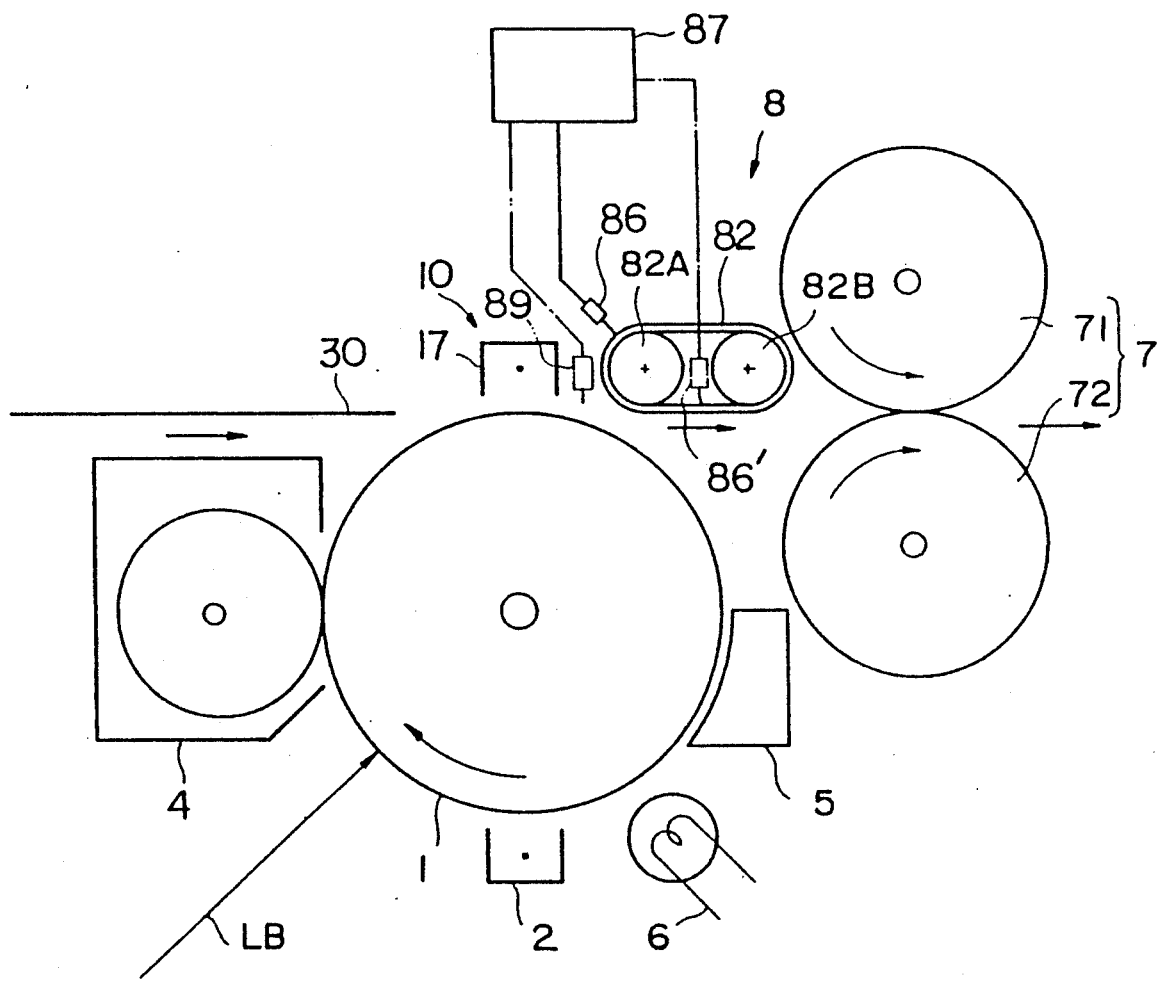
FIG. 5 is a side elevation showing a general arrangement of another laser printer device incorporating a third embodiment of a recording paper transport mechanism.

FIG. 5 is a view showing a general arrangement of a laser beam printer device incorporating the third embodiment. Like numerals and symbols indicate the parts with the same functions as those in FIG. 2. The same applied to other embodiments to be described later.

The present laser beam printer has, as in the foregoing second embodiment, mounted around the charged drum 1, charger unit 2, developing unit 4, a transfer unit 10 having a transfer charger 17 to charge the recording paper 30 to cause the toner image to be transferred to the paper 30, a cleaning unit 5 and a decharger unit 6, all the units being arranged in the order described above in the rotational direction of the drum 1, as indicated by the arrow A in FIG. 5.

Transfer of the toner image formed on the drum 1 to the recording paper 30 takes place by conveying the paper 30 between the drum 1 and the transfer charger 17 of the transfer unit 10' at a speed that is in synchronism with the circumferential speed of the drum 1.

As in the second embodiment, the face-down discharge is accomplished by fixing the image onto the sheet of recording paper 30 and discharging it in the same orientation with its transfer side down, because the transfer unit 10 is located above the drum 1 as shown.

The recording paper 30 after the face-down transfer process is conveyed through a certain feed path by the transport guide mechanism, to be described later, has its toner image fixed by means of the fixing unit 7 and is discharged out or the laser beam printer with its face kept down.

The fixing unit 7 comprises a pair of rollers consisting of a heat roller 72 and a backup roller 71 which are vertically opposite to each other, so that the recording paper 30 is clamped between the rollers 72, 71 under a certain pressure so that the toner image is thermally fixed onto it by means of a heat given by the heat roller 72. The heat roller 72 is connected with a rotational drive unit, not shown, to be rotatably driven at a speed in synchronism with the circumferential speed of the drum 1. This also serves to convey the recording paper 30. That is, the fixing unit 7 is also used as a recording paper transport drive mechanism.

Provided between the transfer unit 10 and the fixing unit 7 is a transport guide mechanism 8.

Figure 6:
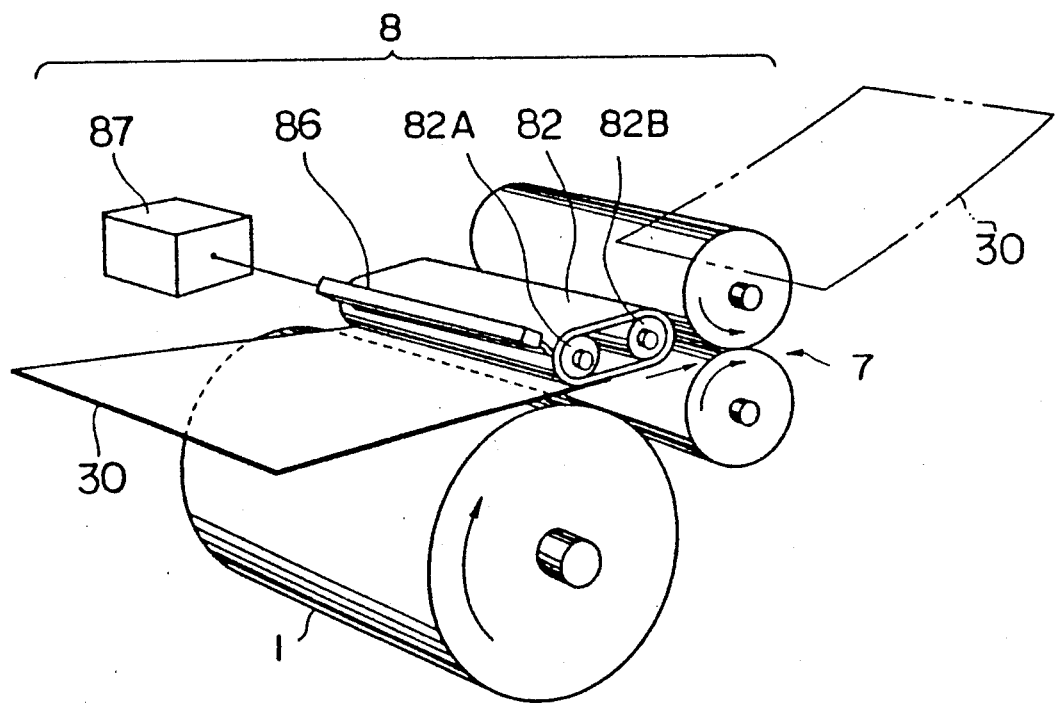
FIG. 6 is a perspective view of the recording paper transport mechanism thereof.

The transport guide mechanism 8, as shown in the perspective view of FIG. 6, comprises a pair of rollers 82A and 82B appropriately spaced from each other and extending in a direction crossing the running direction of the paper 30, an endless belt 82 formed by a flexible dielectric sheet interconnecting the two rollers 82A and 82B, and a brush 86 as a contact element resiliently loaded to contact the endless belt 82.

The rollers 82A and 82B are insulated at their circumferential surfaces with rubber or similar materials, so that the endless belt 82 interconnecting the rollers 82A and 82B is insulated from the chassis, not shown, supporting the rollers 82A and 82B. One of the rollers 82A or 82B is connected with a drive unit, not shown, to be rotatably driven so that the endless belt 82 is circulated at a speed in synchronism with the circumferential speed of the drum 1.

The endless belt 82 is formed, for instance by endlessly joining sheets of dielectric material, such as a fluorocarbon resin of t0.2 to a certain circumferential length. Interconnecting the rollers 82A and 82B, the under side of the circulating path of endless belt 82 thus extends along the recording paper feed path from the transfer unit 10 to the fixing unit 7.

The brush 86 comprises a plurality of conductive elements 1 such as carbon or metal strips or wires, arranged in a row, and located opposite to the roller 82A near the drum 1 with its longitudinal ends flush with the ends of the roller 82A. The leading edge of the brush 86 is forced against the surface of the endless belt 82 around the roller 82A for firm contact therewith.

A high voltage power source 87 is connected to the brush 86 to apply a predetermined voltage thereto.

In the transport guide mechanism arranged as described above, a voltage from the power source 87 is applied to the brush 86, while at the same time, the roller 82A or 82B is rotatably driven to circulate the endless belt 82, whereby the endless belt 81 in contact with the brush 86 is charged. The recording paper 30 with the toner image transferred from the transfer unit 10 is thus statically attracted at its back side with no transfer image attracted to the lower section of the circulating endless belt 82 and is conveyed to the fixing unit 7 with the circulation of the endless belt The voltage to be applied to brush 86 may be $-1.2$ kV for a thin sheet of recording paper or, $-2.5$ kV for a heavier one, such as an OHP (over head projector) sheet, for effective holding and transport. The endless belt 82 may be positively charged. In this case, the endless belt 82 is preferably made of nylon or other similar material that is easier to be positively charged.

The arrangement of the brush 86 on the endless belt 82 as mentioned above is not necessarily as disclosed in this embodiment, but another layout is possible such that the brush 86 is located within the circulation path of the endless belt 82 to contact the inner surface of the belt as indicated by the dot-dash line 86' in FIG. 5.

In addition to the arrangement above, there may be provided a second brush 89 of conductive property located between the transfer unit 10 and the transport guide mechanism 8 as indicated by the double-dot-dash line in FIG. 5 so that it contacts the recording paper being in travel to charge the same. Applied to the second brush 89 may be a voltage with a polarity opposite to that applied to the endless belt 82 (e.g. $+400 - +800$ V) so that the recording paper 30 is charged with an opposite polarity to the endless belt 82. This allows the recording paper 30 to be stuck fast onto the endless belt 82 with an enhanced static power. This is particularly effective for a heavier transfer material (recording paper) such as the OHP sheet. In this case, the recording paper charger is not necessarily a conductive brush, but may be a conductive roller connected with a power source to be brought into contact with the recording paper 30 or a Corona charger as an alternative.

Figure 8:
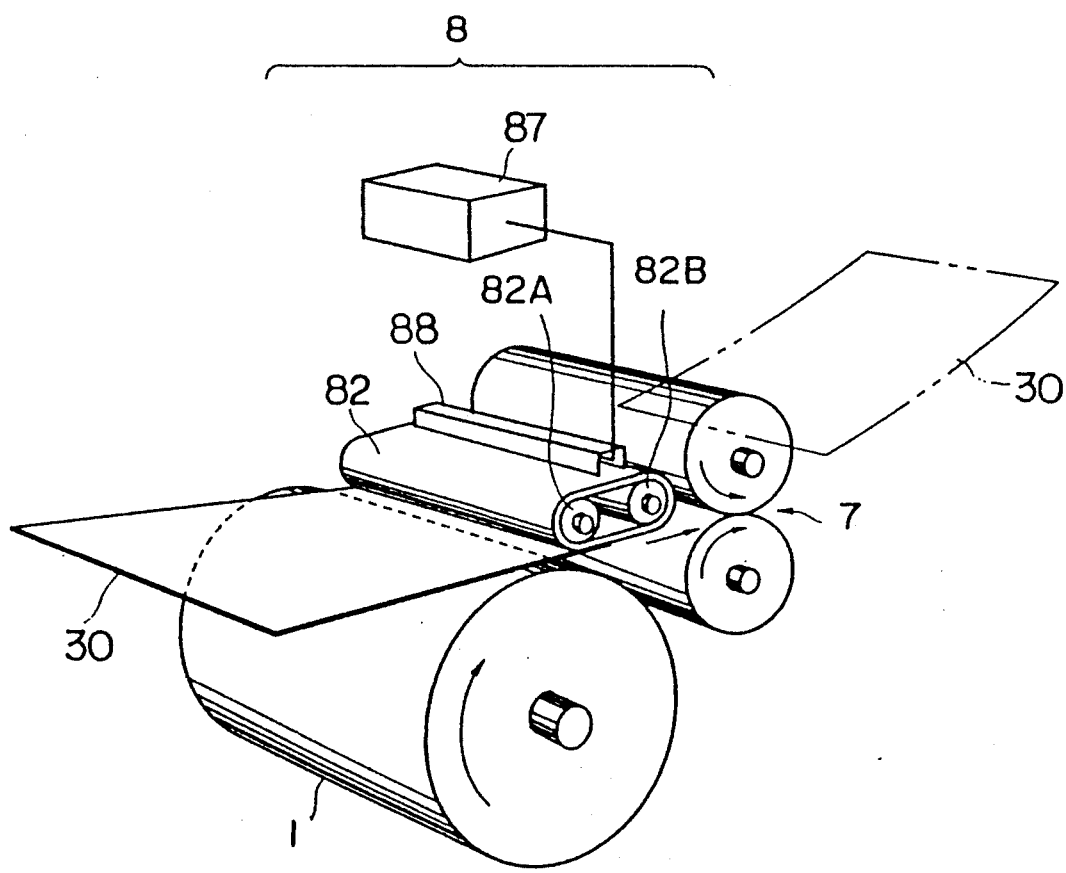
FIG. 8 is a perspective view of the recording paper transport mechanism thereof.
Figure 9:
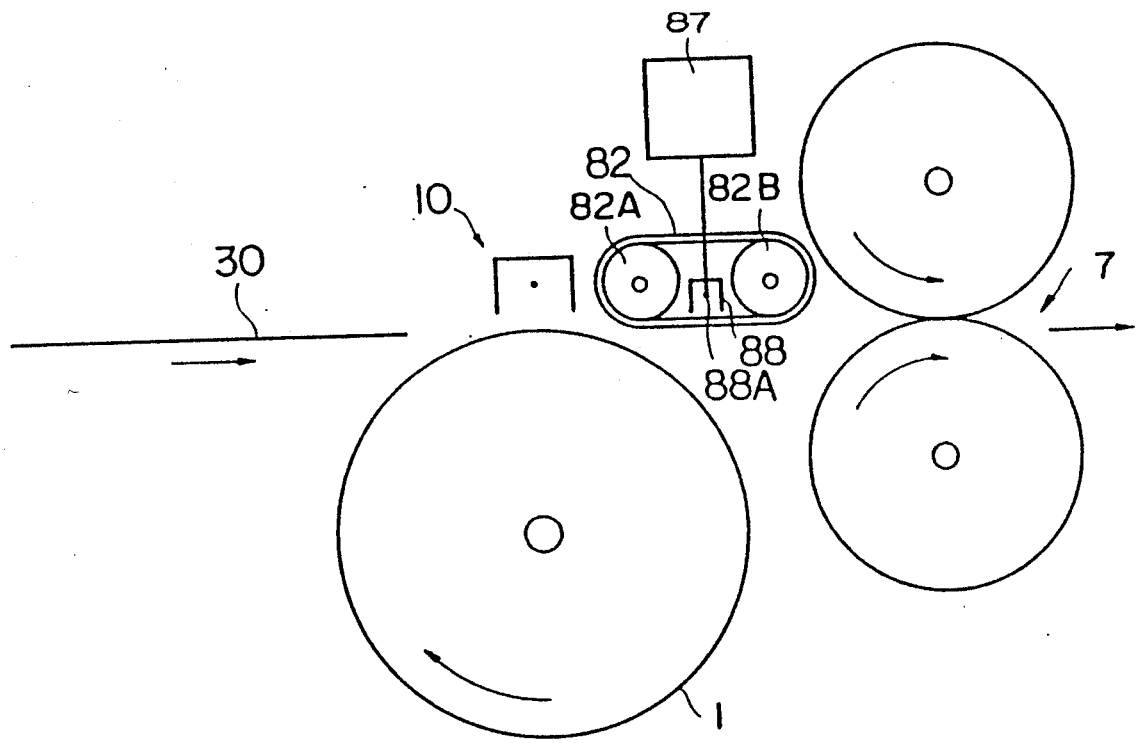
FIG. 9 is a side elevation showing a general arrangement of a laser beam printer device with a differently located Corona charger.

A fourth embodiment is now described with reference to FIGS. 7 through 9.

Figure 7:
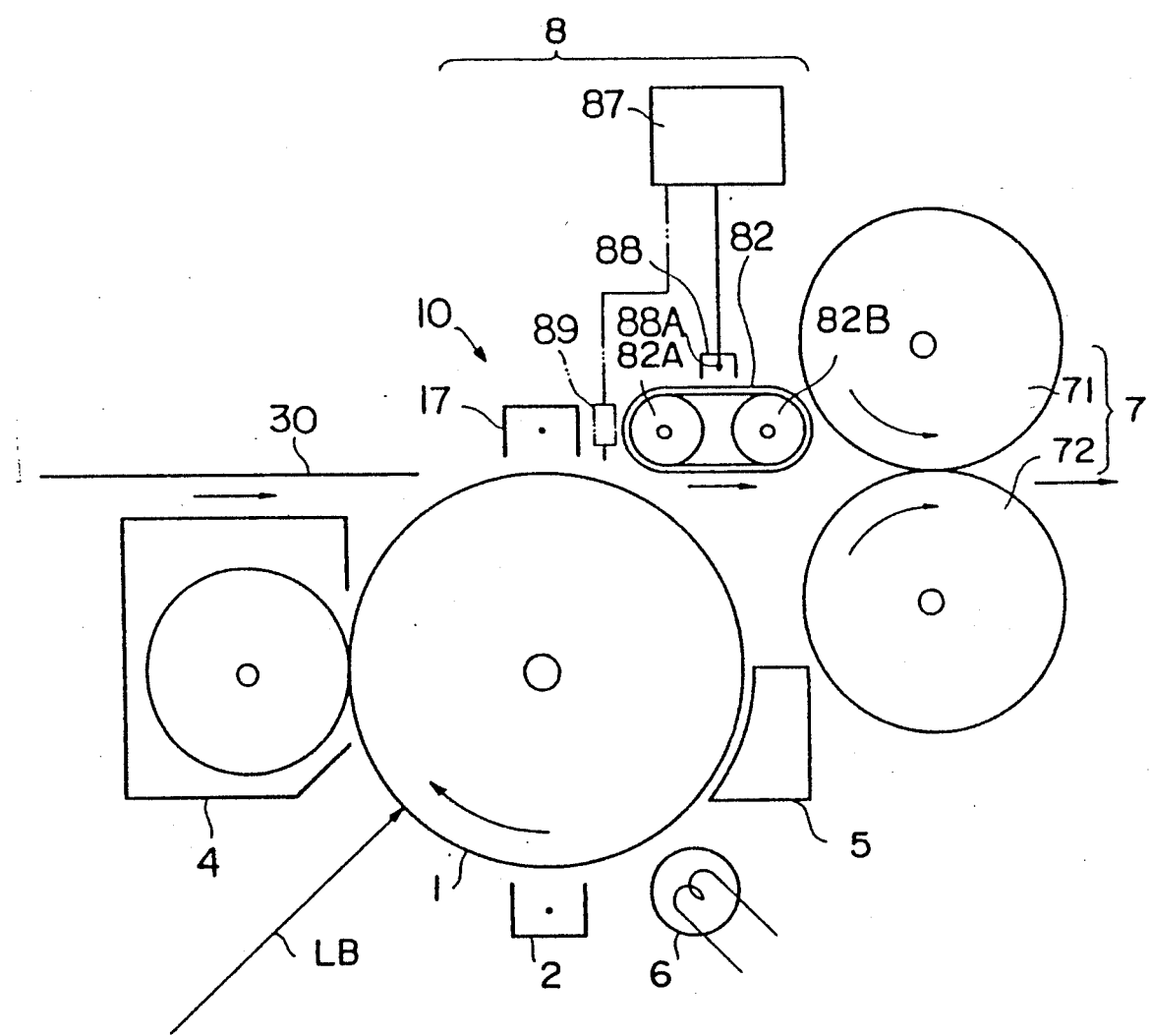
FIG. 7 is a side elevation showing a general arrangement of still another laser printer device incorporating a fourth embodiment of a recording paper transport mechanism.

FIG. 7 is a side elevation showing a general arrangement of a laser beam printer device incorporating the fourth embodiment, which is, like in the third embodiment described, provided with a transport guide mechanism 8 between the transfer unit 10 and the fixing unit 10. It differs from the third embodiment in that, while in the third embodiment the brush connected with the power source is provided to contact the endless belt of dielectric sheet to charge the belt thereby conveying the recording paper statically stuck to it, a corona charger is used to charge the endless belt in this embodiment.

The transport guide mechanism 8, with its perspective view shown in FIG. 7, includes a Corona charger 88 located opposite to the upper section of the circulation path of the endless belt 82.

This embodiment obviously shares with the foregoing third embodiment other details such as material of the endless belt 82, its location and connection with other parts, insulating treatment on the circumference of the rollers 82A and 82B to insulate the endless belt 82 from the chassis, drive connection of one roller 82A or 82B with a drive unit, not shown, for circulating movement of the endless belt 82 with the drive unit.

The Corona charger 88 consists of a so-called trocoron, with its wires 88A convered with a shield plate 88B except for those opposite to the endless belt 82. The Corona charger 88 thus discharges a corona when a high voltage is applied to it from the high voltage power source 87 connected with the Corona charger 88A. The Corona charger 88 is as long as the width of the endless belt 82 and is so located above the upper section of the circulation path of the endless belt 82 at a certain space therefrom that its longitudinal side crosses the circulating path of the endless belt 82. Corona discharged from the Corona charger 88 thus charges the endless belt 82.

In the transport guide mechanism arranged as described above, a voltage (above +4 kV, e.g. 5 kV) from the power source 87 is applied to the wires 88A of the Corona charger 83, while at the same time, the roller 82A or 82B is rotatably driven to circulate the endless belt 82, whereby the endless belt 81 is charged by a Corona discharged from the Corona charger 88. The recording paper 30 with the toner image transferred from the transfer unit 10 is thus statically attracted at its back side (with no transfer image) attracted to the lower section of the circulating endless belt 82 and is conveyed to the fixing unit 7 with the circulation of the endless belt 82.

The arrangement of the Corona charger 88 on the endless belt 82 as mentioned above may alternatively be such that the Corona charger 88 is located within the circulation path of the endless belt 82 to contact the inner surface of the belt lower section as indicated in FIG. 5.

As in the third embodiment, the arrangement above may additionally be provided with a recording paper charging means, shown to be a conductive brush 89, located between the transfer unit 10 and the transport guide mechanism 8, as indicated by the double-dot-dash line in FIG. 7, so that the recording paper 30 is charged with an opposite polarity to the endless belt 82. This allows the recording paper 30 to be stuck fast onto the endless belt 82 with an enhanced electro static power.

A fifth embodiment is now described with reference to FIGS. 10 through 12.

Figure 10:
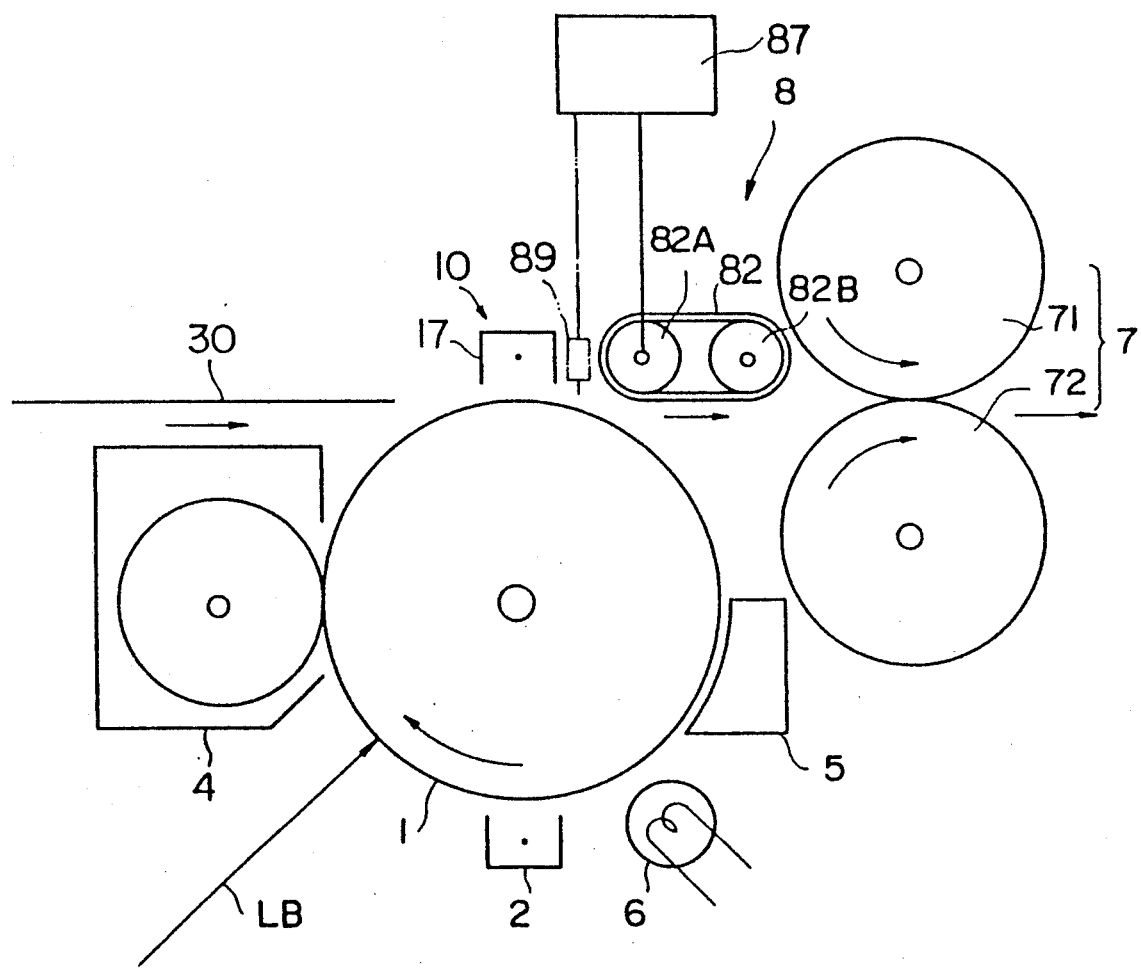
FIG. 10 is a side elevation showing a general arrangement of still another laser printer device incorporating a fifth embodiment of a recording paper transport mechanism.

FIG. 10 is a side elevation showing a general arrangement of a laser beam printer device incorporating the fifth embodiment, which comprises a transport guide mechanism 8 located between the transfer unit 10 and the fixing unit 7, as in the foregoing third and fourth embodiments.

In this embodiment, a pair of rollers are interconnected by an endless belt 82 or similar roller means made of a conductive material are connected with a power source to charege the endless belt.

Figure 11:
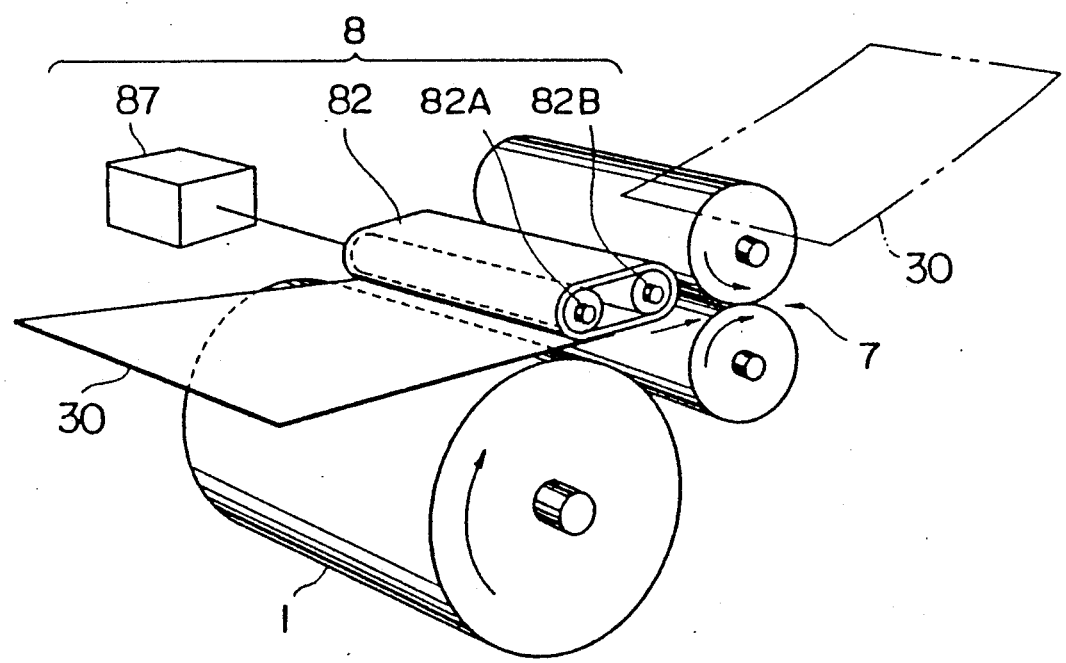
FIG. 11 is a perspective view of the recording paper transport mechanism thereof.

The transport guide mechanism 8, as shown in the perspective view of FIG. 11, comprises a pair of rollers 82A and 82B appropriately spaced from each other and extending in a direction crossing the running direction of the paper 30 and an endless belt 82 formed by a flexible dielectric sheet interconnecting the two rollers 82A and 82B.

The roller 82A near the transfer unit 4 is covered at its outer circumference with a conductive material, such as a conductive rubber, and is connected with a high-voltage power source 87 which applies a predetermined voltage to the circumference of the roller 82A.

The other roller 82B is insulated at their outer circumference with rubber or similar material, so that the endless belt 82 interconnecting the rollers 82A and 82B are insulated from the chasis, not shown, supporting the roller 82B.

One of the rollers 82A and 82B is connected with a drive unit, 1 not shown, to be rotatably driven so that the endless belt 82 is circulated at a speed in synchronism with the circumferential speed of the drum 1.

The endless belt 82 is formed, for instance, by endlessly joining sheets of dielectric material, such as fluorocarbon resin of t0.2 to a certain circumferential length. Interconnecting the rollers 82A and 82B, the lower section of the circulation path of the endless belt 82 thus extends along the recording paper feed path from the transfer unit 10 to the fixing unit 7.

In the transport guide mechanism arranged as described above, a voltage from the power source 87 is applied to the roller 82A, while at the same time, the roller 82A or 82B is rotatably driven to circulate the endless belt 82, whereby the endless belt 81 is charged due to an electrostatic induction. The recording paper 30 with the toner image transferred from the transfer unit 10 is thus statically attracted at its back side with no transfer image) to the lower section of the circulating path of the endless belt 82 and is conveyed to the fixing unit 7 with the circulation of the endless belt 82.

Voltage to be applied to the roller 82A may be $-1.2$ kV for a thin sheet of recording paper, and $-2.5$ kV for a heavier one, such as the OHP sheet for effectively holding and transporting action the recording paper. The endless belt 82 may also be charged positively. In this case, the endless belt 82 is preferably made of nylon or some material that is easier to be positively charged.

While, in this embodiment, the roller 82A is made of a conductive material to be connected with the high-voltage power source 87 and the other roller 82B is formed by an insulating body, it is easily understood that the property of the rollers can be reversed or that both rollers may be supplied with a voltage.

Figure 12:
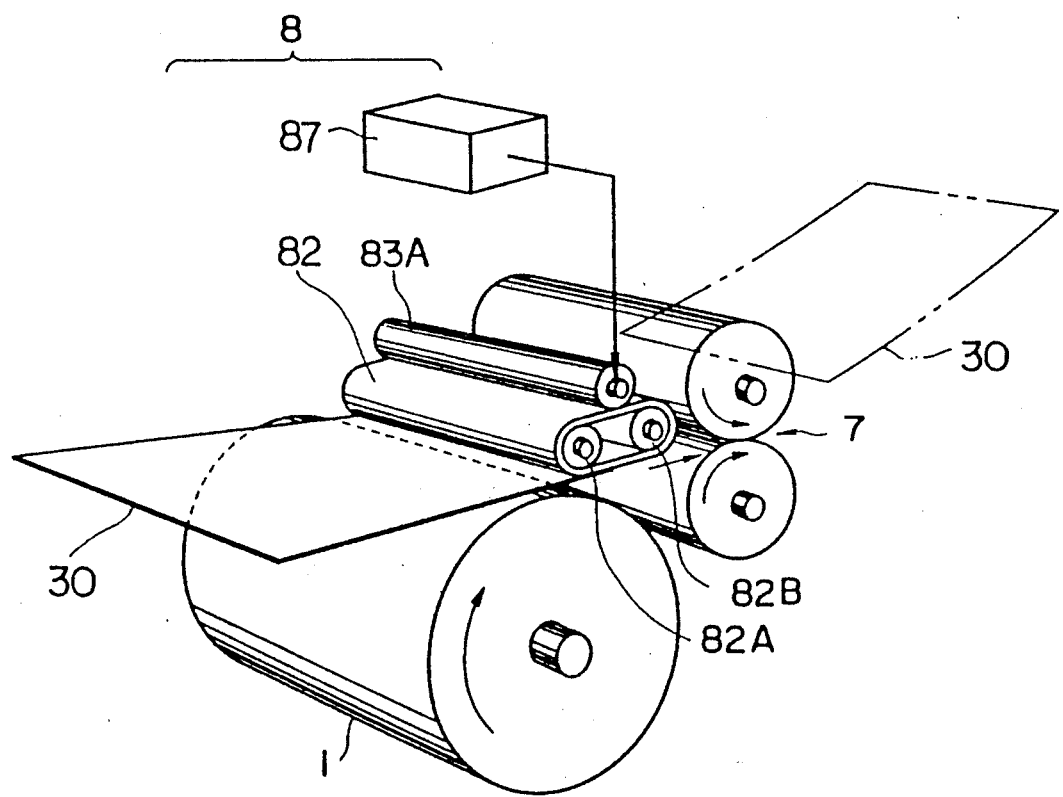
FIG. 12 is a perspective view showing other embodiment of the recording paper transport mechanism with an endless belt to be charged.

Furthermore, the endless belt 82 may be charged by another roller arrangement such that, as shown in FIG. 12, a rotatable free roller 83A covered at its outer circumference with a conductive material is provided in contact with the upper section of the circulating path of the endless belt 82 interconnected by the rollers 82A and 82B. The free roller 83 is connected with the high-voltage power source 87, which applies a voltage to the free roller 83A so as to charge the endless belt 82.

As in the third embodiment, the arrangement above may additionally be provided with a recording paper charging means, shown to be a conductive brush located between the transfer unit 10 and the transport guide mechanism 8, as indicated by the double-dot-dash line in FIG. 10.

A sixth embodiment is now described with reference to FIGS. 13 through 15.

Figure 13:
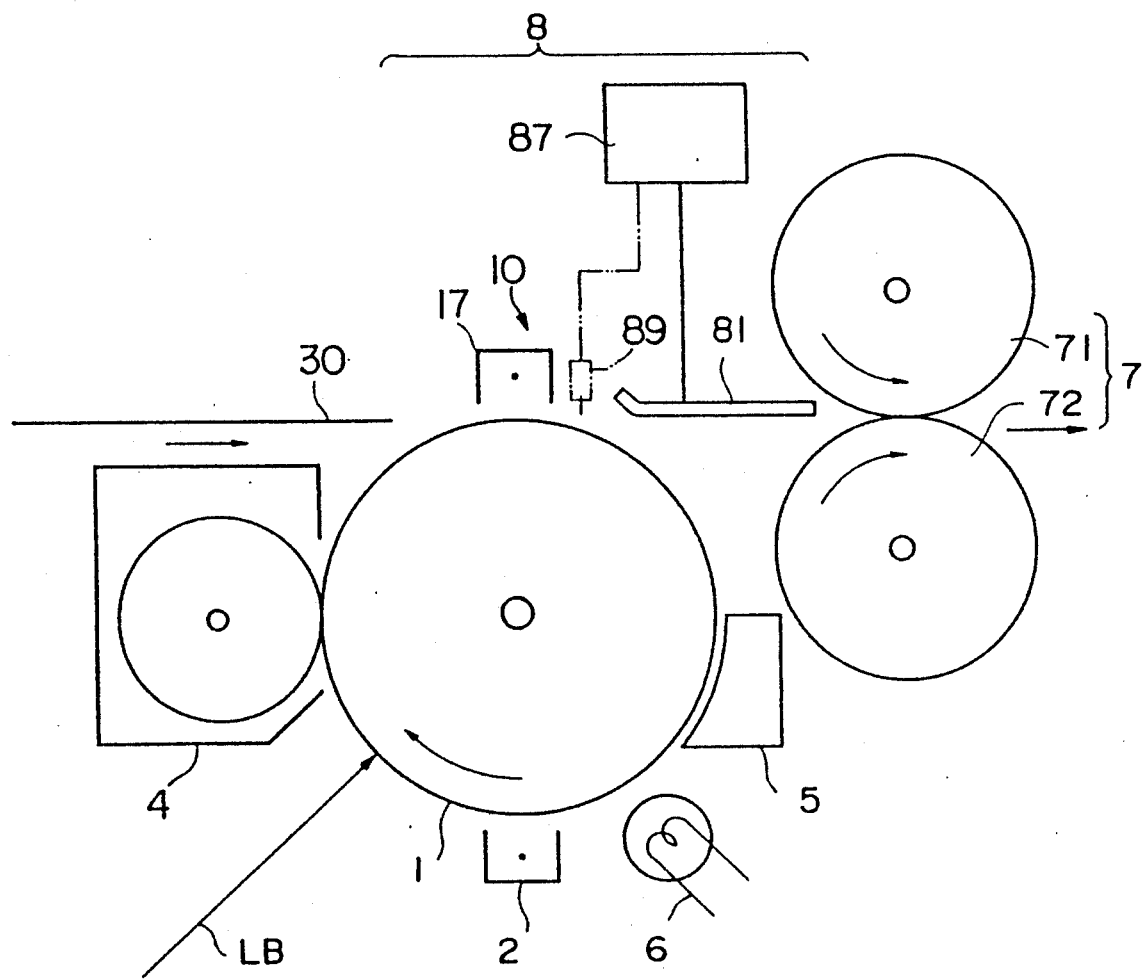
FIG. 13 is a side elevation showing a general arrangement of still another laser printer device incorporating a sixth embodiment of a recording paper transport mechanism.

FIG. 13 is a side elevation showing a general arrangement of a laser beam printer device incorporating the sixth embodiment, which comprises a transport guide mechanism 8 located between the transfer unit 10 and the fixing unit 7.

Figure 14:
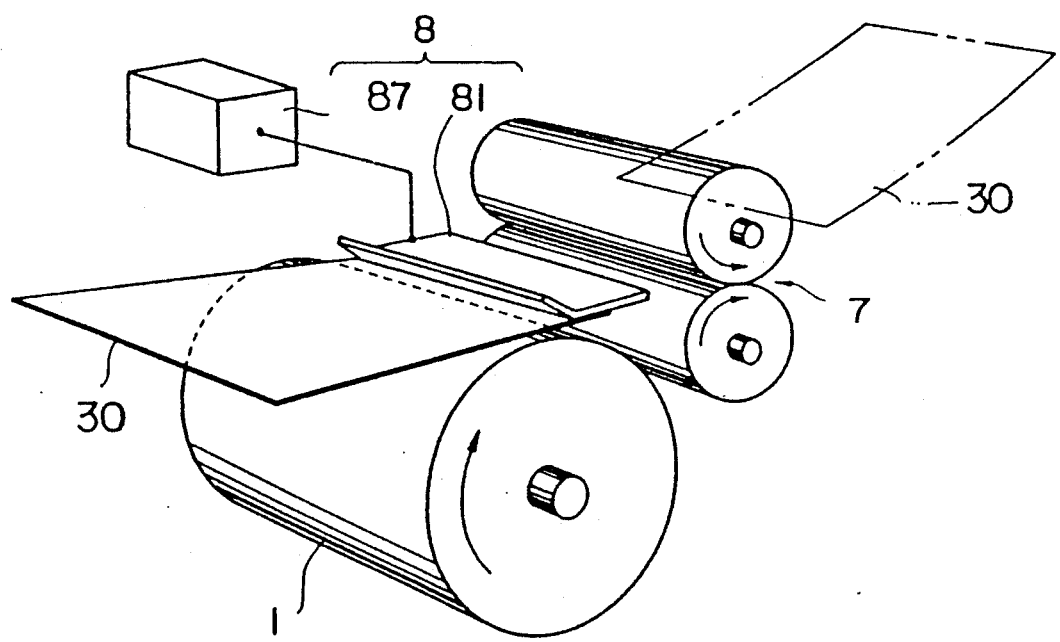
FIG. 14 is a perspective view of the recording paper transport mechanism thereof.

The transport guide mechanism 8 comprises a guide plate 81 with its down face extending along the recording paper feed path from the transfer unit 4 to the fixing unit, as illustrated in the perspective view of FIG. 14. The guide plate 81 is connected with the high-voltage power source 87.

The guide plate 81, of a metal sheet with a predetermined thickness, is sized to substantially extend across the whole range of the recording paper feed path from the transfer unit 4 to the fixing unit 7.

The guide plate 81, arranged as described above, is charged when a voltage from the power source 87 is applied thereto, thereby attracting the recording paper 30 due to its static electricity. The recording paper 30 is thus attracted to its down side (with no transfer image)

to the down side of the guide plate 81 to be conveyed along it exactly to the fixing unit 7. The voltage to be applied to the guide plate 81 may be −1.2 to −1.5 kV for a thin sheet of recording paper, and −2.5 kV for a heavier one, such as the OHP sheet, for effectively holding and transporting the action the recording paper. The guide plate 81 may also be positively charged.

Figure 15:
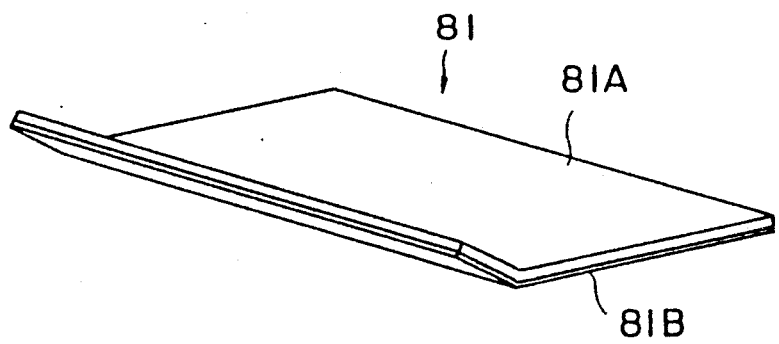
FIG. 15 is a perspective view showing another embodiment of a guide plate.

FIG. 15 is an alternative embodiment of the guide plate 81, in which its down face (attracting the recording paper 30) is formed with a non-conductive resin film 81B. This film layer prevents any current from passing through the recording paper 30, even if the resistance value at the recording paper 30 changes due to humidity or similar causes, thus maintaining a required attraction power. Furthermore, the guide plate 81 may be entirely covered with such a resin film to protect people from shocks due to inadvertently touching this part of the device.

As in the third embodiment, the arrangement above may additionally be provided with a recording paper charging means, shown to be a conductive brush 89, located between the transfer unit 10 and the transport guide mechanism 8 as indicated by the double-dot-dash line in FIG. 13.

Figure 16:
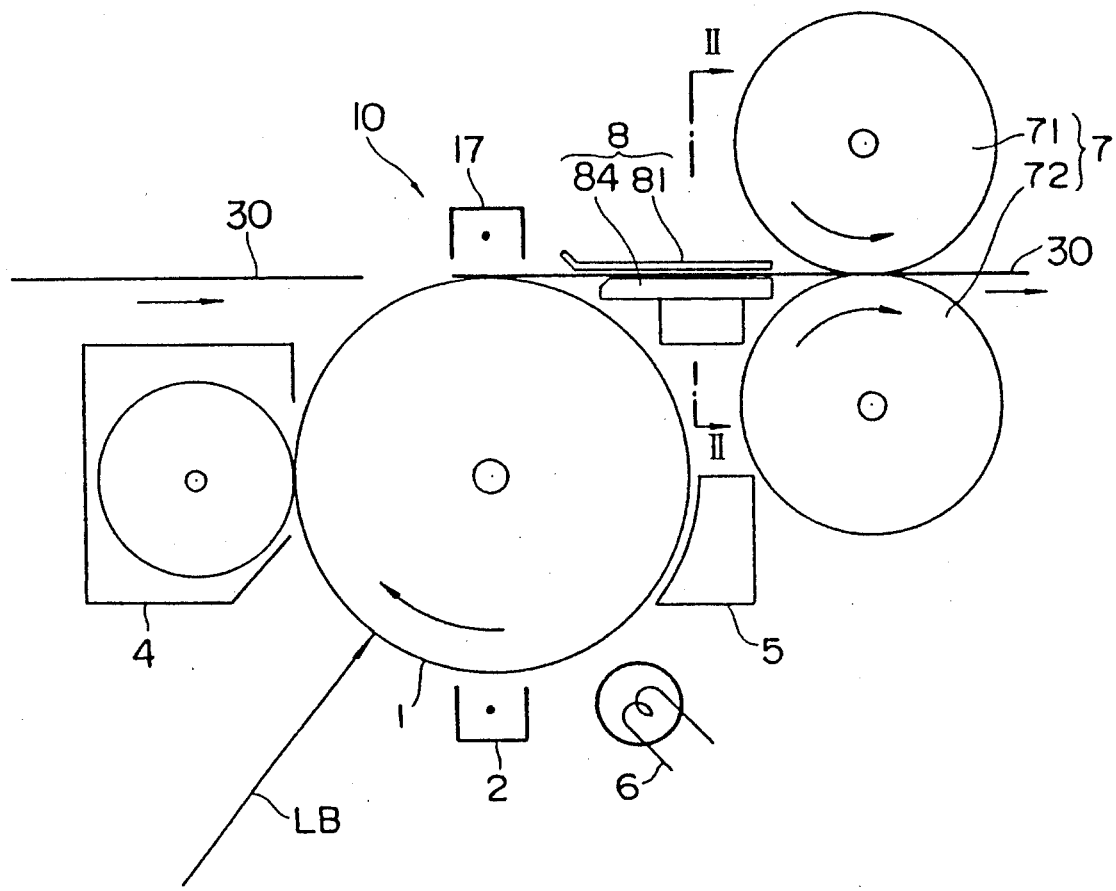
FIG. 16 is a side elevation showing a general arrangement of still another laser printer device incorporating a seventh embodiment of a recording paper transport mechanism.

FIG. 16 is a side elevation view showing a general arrangement of a laser beam printer device incorporating the seventh embodiment, which comprises a transport guide mechanism 8 located between the transfer unit 10 and the fixing unit 7.

Figure 17:
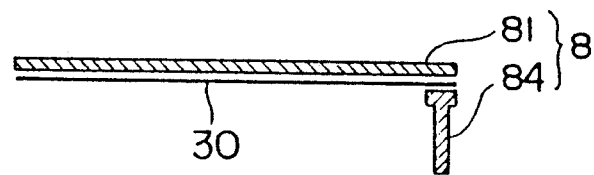
FIG. 17 is a section taken along the line II—II thereof.

The transport guide mechanism 8 comprises a guide plate 81 having a width that is greater than that of the recording paper 30, which extends along the top of a predetermined recording paper feed path from the transfer unit 4 to the fixing unit 7, as illustrated in FIG. 17, which is a section taken along line II—II of FIG. 16. Further provided is an underguide 84 placed under one edge of the guide plate 81 (right side in FIG. 17 when viewed in front of the drawing), whose top face is spaced from the bottom face of the guide plate 81 at a certain distance to allow the recording paper 30 to pass therethrough. The lateral (widthwise) location of the underguide 84 is such that it falls upon a marginal area of the recording paper 30 with no toner image transferred.

The ends facing the transfer unit 4 of the guide plate 81 and the underguide 84 are outwardly bent and chamfered respectively for easier insertion of the recording paper 30 into the space between them.

In the laser beam printer arranged as above, the toner image formed on the drum 1 is transferred to down face of the recording paper 30 at the transfer unit 4. When the recording paper 30 with the transfer image is then carried to the fixing unit 7, the side edge of the recording paper 30 is inserted into a space between the guide plate 81 and the underguide 84 of the transport guide mechanism 8. That is, the edge of the recording paper 30 is captured between the guide plate 81 and the underguide 84 so that the whole recording paper is held in position with its own rigidity, while being guided in its feeding direction until it is correctly brought into the space between the heat roller 72 and the backup roller 71.

The guide plate may be formed by a metal plate with or without a sheet of dielectric material bonded to the down face thereof. By applying a voltage to this metal plate, the recording paper is statically attracted to it in the same manner as in the sixth embodiment mentioned above.

Figure 18:
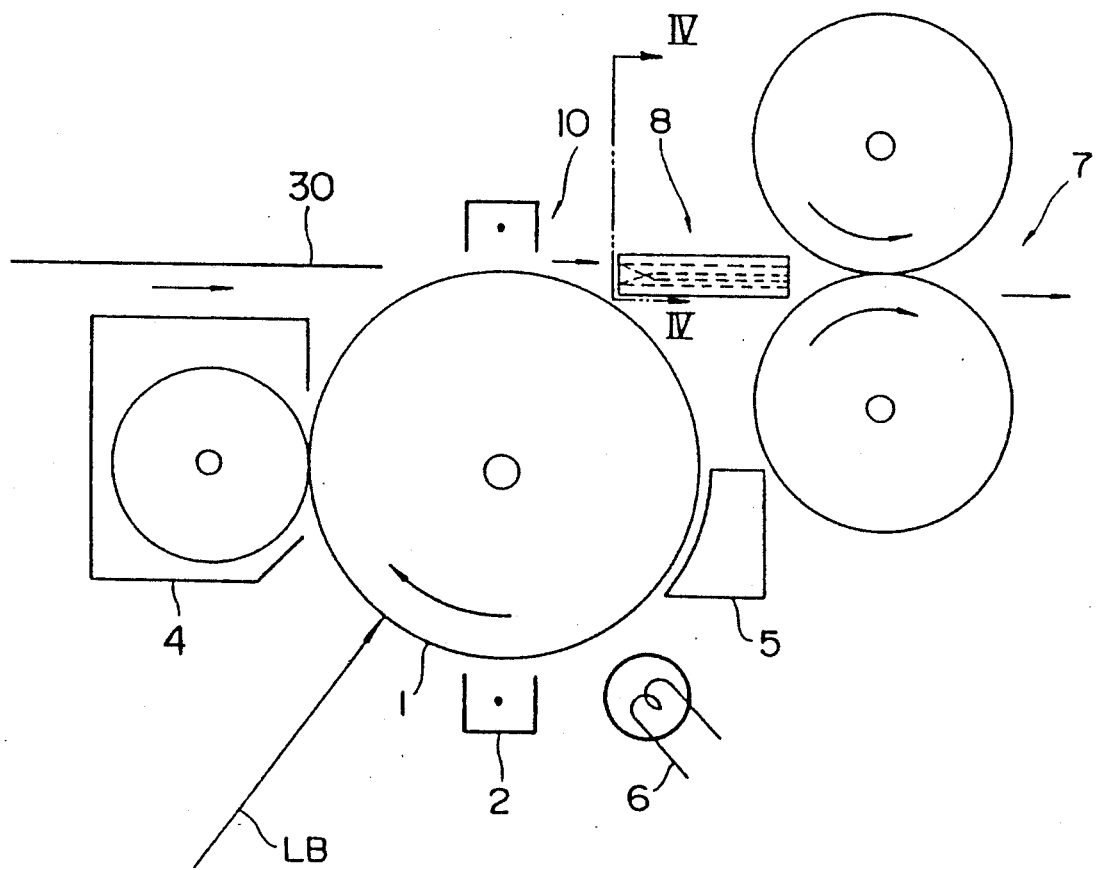
FIG. 18 is a side elevation showing a general arrangement of still another laser printer device incorporating a eighth embodiment of a recording paper transport mechanism.

An eighth embodiment of the invention is described with reference to FIGS. 18 and 19.

The transport guide mechanism 8 according to the eighth embodiment comprises a guide plate 81 located above the recording paper feed path from the transfer unit 10 to the fixing unit 7, one side edge of which is provided with a bent guide portion 810.

As shown in an enlarged view of FIG. 20, the bent guide portion 810 is formed by profiling one side of the transport guide mechanism 8 to a reversed C shape, with its end provided with a projection 812 pointed upward, i.e. towards the guide plate 81. The guide plate 81 is further provided at its side edge with a downward projection 813 which is laterally offset at a certain distance from the projection 812. The two projections 812 and 813 thus define a recording paper holding space 811 profiled to a so-called crank shape which continuously extends along the feed path of the recording paper 30.

The crank-shaped cross section of the paper holding space 811 is so dimensioned that, for instance, distance (h) between the top surface of the projection 812 and the bottom surface of the guide plate 81 is 1 mm, distance (w) between the side surface of the projection 812 and that of the projection 813 is 2 mm, and distance (d) between the top surface of the projection 812 and the bottom surface of the projection 813 is 1 mm.

Furthermore, the end faces of the projections 812 and 813 as an inlet of the recording paper (near the transfer unit 4) are ramped at a certain angle for smoother insertion of the end of the recording paper 30 into the paper holding space 811.

Figure 19:
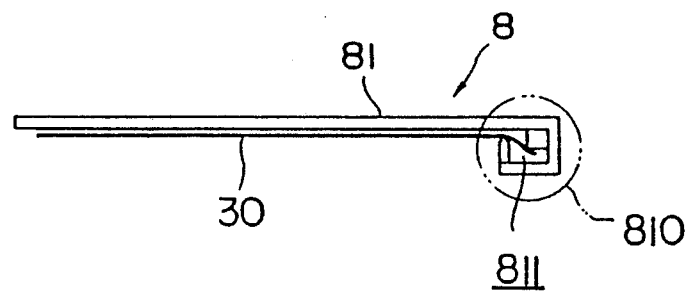
FIG. 19 is a view taken in the direction of arrow IV.
Figure 20A:
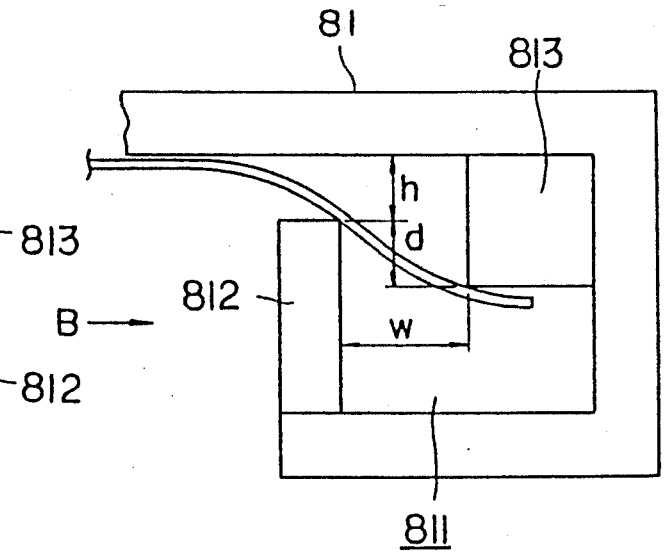

With this guide mechanism 8 according to the eighth embodiment as above, as shown in FIGS. 19 and 20(A), the edges of the recording paper 30 is bent to a substantially S shape, as shown in FIG. 20(A) by the opposite edges of the projections 812 and 813 which define the paper holding space 811. This bend of the recording paper edge means that the paper 30 is held in a manner similar to a cantilever support because of its own rigidity, with the other, unsupported edge of the recording paper also being kept straight without hanging down for correct guiding.

While the foregoing seventh embodiment is applicable to a sheet of paper with a certain rigidity (tautness) such as the OHP sheet or thicker paper because the recording paper is held only at one edge, allowing the remaining area to freely flex, the arrangement according to the eighth embodiment enables softer recording paper to be held without such flexing.

In a ninth embodiment, shown in FIGS. 21 and 22, the upper guide element of the guide mechanism 8 is formed by an upper roller 820 having a guide collar 821 fitted to one end of the upper roller 820. The guide collar 820 defines a crank-shaped recording paper holding space 811 similar to that in the foregoing eighth embodiment together with an L-profiled underguide 84 located under the roller 820. The upper roller 820 is connected with a drive unit now shown to be rotatably driven at a speed in synchronism with the circumferential speed of the drum 1, i.e., feed speed of the recording paper.

With the arrangement of the ninth embodiment, the recording paper 30 is held by the recording paper holding space 811 defined by the upper roller 820, the guide collar 821 and the underguide 84, while at the same time conveying the recording paper 30 to the fixing unit 7 by means of rotation of the upper roller 820.

In a tenth embodiment, shown in FIGS. 23 and 24, there are provided between the transfer unit 4 and the fixing unit 7 a pair of appropriately spaced rollers 82A and 82B which are insulated with rubber or a similar material extending in the direction crossing the feed path of the recording paper 30. The rollers 82A and 82B are interconnected by an endless belt 82 formed by a sheet of dielectric material, such as fluorocarbon resin. One roller 82B near the fixing unit 7 is at one end provided with a guide collar 821 similar to that in the foregoing ninth embodiment fitted thereto, forming the upper guide element of the transport guide mechanism 8. The under face of the endless belt 82 interconnecting the two rollers 82A and 82B extends along the recording paper feed path connected between the transfer unit 4 and the fixing unit 7.

An L-profiled underguide 84 is located under roller 82B with the guide collar 821 fitted thereto, forming the crank-shaped recording paper holding space 811 similar to those in the foregoing eighth and ninth embodiments.

At least one of the rollers 82A and 82B is rotatably driven by a drive unit, not shown, so that the lower section of the endless belt 82, i.e., belt section extending along the recording paper feed path, is circulated at a speed in synchronism with the paper feed speed in the same direction as the feed direction.

The endless belt 82 is at its upper section of the circulating path equipped with a charger for charging the endless belt 82. While in FIG. 23 the charger is formed by an electrically energized brush 86 located to rub the surface of the endless belt 82, it may alternatively consist of a Corona charger used for a transfer unit or the like, or one of the rollers made of conductive material and insulated from its surrounding parts, which is electrically energized by a predetermined voltage. Furthermore, it may be replaced with a frictional charging element located to be pressed against the endless belt 82 to charge it by circulation thereof.

The recording paper 30 after the transfer process is thus statically attracted to the under face of the endless belt 82, while being conveyed to the fixing unit 7 by the circulating movement of the belt 82. Since an edge of the recording paper 30 is held by the recording paper holding space 811 at the roller 82B near the fixing unit 7, the paper is accurately guided to the space between the heat roller 72 and the backup roller 71 at the fixing unit 7.

As has been fully described above, the device embodying the invention makes it possible to hold and convey the recording paper by electrostatically attracting the back side of the recording paper with no toner image transferred or by holding only a marginal area of the recording paper, thereby successfully holding and guiding a sheet of recording paper with a toner image on its down face or a curled sheet of recording paper. This enables the paper with an unfixed toner image to be transported in a face-down state, minimizing the length of the recording paper feed path in an image producing device with a face-down discharge system. This finally makes it possible to provide a compact image production device with a face down paper discharge system which rarely suffers from problems such as paper clogs.

What is claimed is:

1. A recording paper transport mechanism in an imaging device employing an electrophotographic process, comprising guide members having upward and downward projections that interface with each other for restricting an up and down displacement of a side edge of a recording paper which is provided on at least one lateral side of a recording paper feed path extending from a transfer unit to a fixing unit, said guide members being spaced from each other to allow said recording paper to pass through said space to restrict said up and down displacement of said lateral edge of said recording paper, whereby said recording paper is held and guided in its feed direction, while a means for transporting said recording paper operates to transport said recording paper to said fixing unit by said transporting means.

2. A recording paper transport mechanism in an imaging device employing an electrophotographic process, comprising guide members for restricting an up and down displacement of a side edge of a recording paper which is provided on at least one lateral side of a recording paper feed path extending from a transfer unit to a fixing unit, said guide members being spaced from each other to allow said recording paper to pass through said space to restrict said up and down displacement of said lateral edge of said recording paper, whereby said recording paper is held and guided in its feed direction to be brought into said fixing unit, said guide members comprising upward and downward projections interfacing with each other to define a crank-shaped guide space to allow said recording paper to pass therethrough.

3. The mechanism according to claim 2, further comprising a roller located above said recording paper feed path and adapted to be rotated in the same direction as the paper feed direction, said roller having a larger-diameter collar fitted to one end thereof forming said downward projection.

4. The mechanism according to claim 3, wherein the roller is at least one of the rollers interconnected by an endless belt for conveying said recording paper.

5. A recording paper transport mechanism, comprising:
a recording paper feed path; and
means for restricting an up and down displacement of an edge of a recording form provided on a lateral side of said recording paper feed path, said restricting means having a space therein through which said recording paper passes, said space restricting said up and down displacement of said lateral edge of said recording paper, whereby said recording paper is held and guided in its feed direction, said restricting means having upward and downward projections that interface with each other to allow said recording paper to pass therethrough.

6. A recording paper transport mechanism, comprising:
a recording paper feed path; and
means for guiding at least one edge of a recording paper provided on a lateral side of said feed path, said guiding means having a space therein through which said recording paper passes, at least one edge of said recording paper being bent in either a downward direction or an upward direction while passing through an upward projection and a downward projection that interfaces with each other to form said space, said recording form being held and guided in its feed direction.

* * * * *

UNITED STATES PATENT AND TRADEMARK OFFICE
CERTIFICATE OF CORRECTION

PATENT NO. : 5,045,892
DATED : September 3, 1991
INVENTOR(S) : Satoru MORISAWA et al.

It is certified that error appears in the above-indentified patent and that said Letters Patent is hereby corrected as shown below:

At column 16, line 44 (claim 5, line 5), change "form" to ---paper---.

At column 16, line 65 (claim 6, line 12), change "form" (second occurrence) to ---paper---.

Signed and Sealed this

Tenth Day of October, 1995

Attest:

BRUCE LEHMAN

Attesting Officer     Commissioner of Patents and Trademarks